Figure 1:
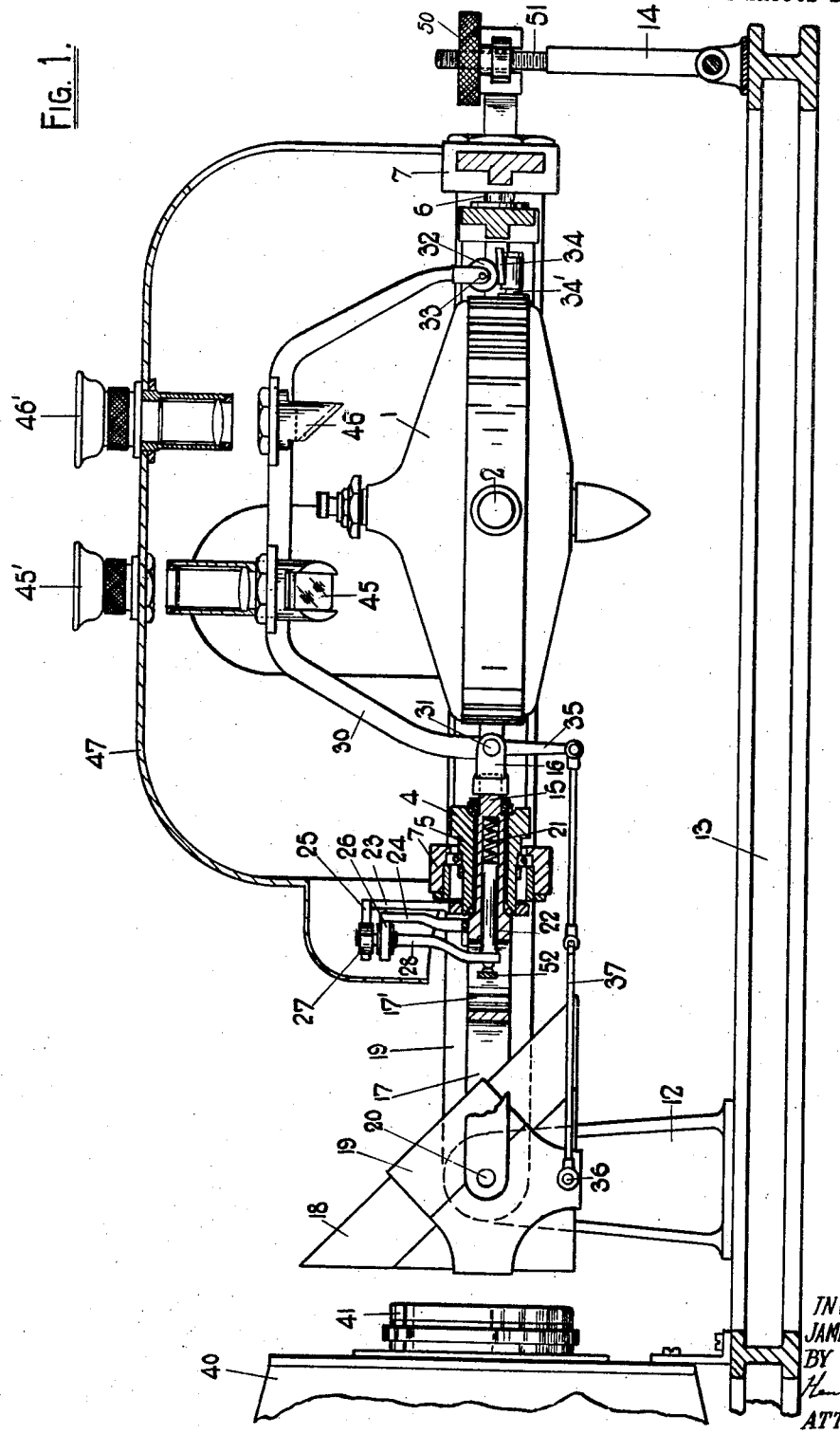

April 16, 1929.  J. B. HENDERSON  1,709,314
GYROSCOPIC STABILIZATION OF CAMERAS AND OTHER OPTICAL INSTRUMENTS
Filed Nov. 15, 1923  4 Sheets-Sheet 3
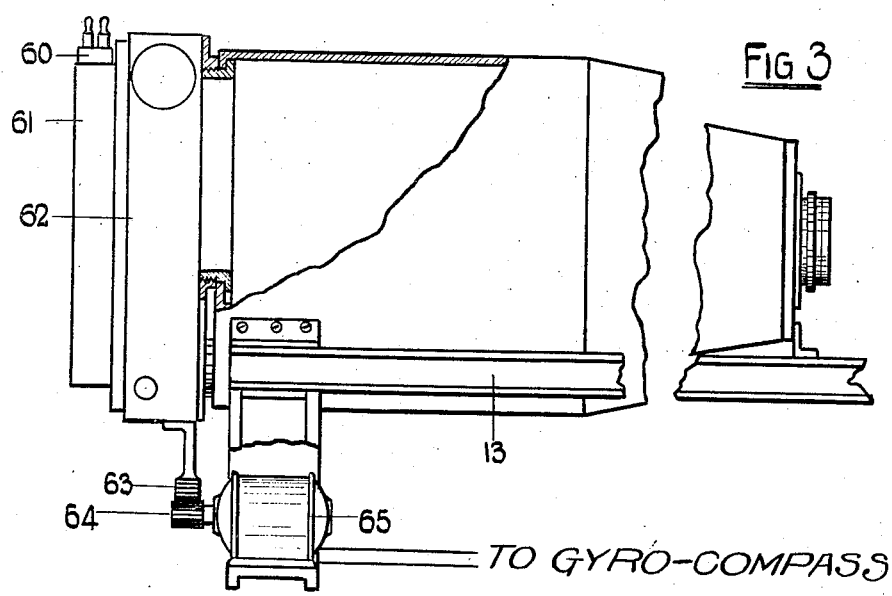
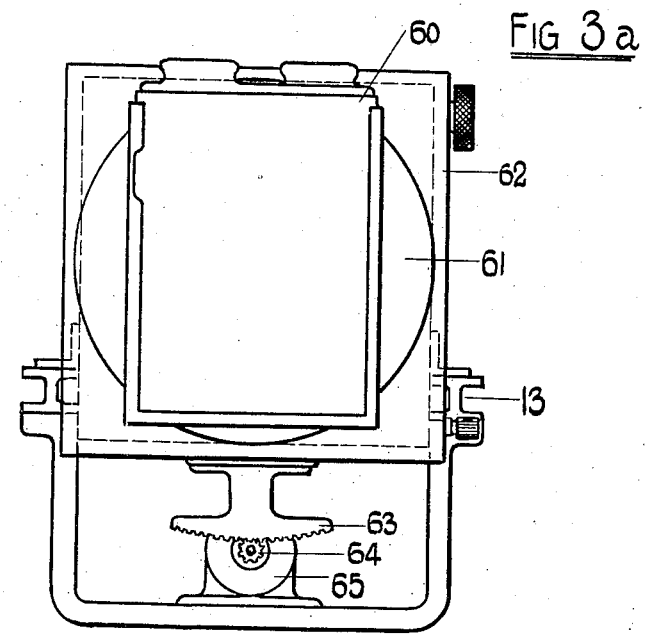
INVENTOR
JAMES B. HENDERSON
BY
ATTORNEY April 16, 1929.                J. B. HENDERSON                1,709,314
          GYROSCOPIC STABILIZATION OF CAMERAS AND OTHER OPTICAL INSTRUMENTS
                          Filed Nov. 15, 1923          4 Sheets-Sheet 4
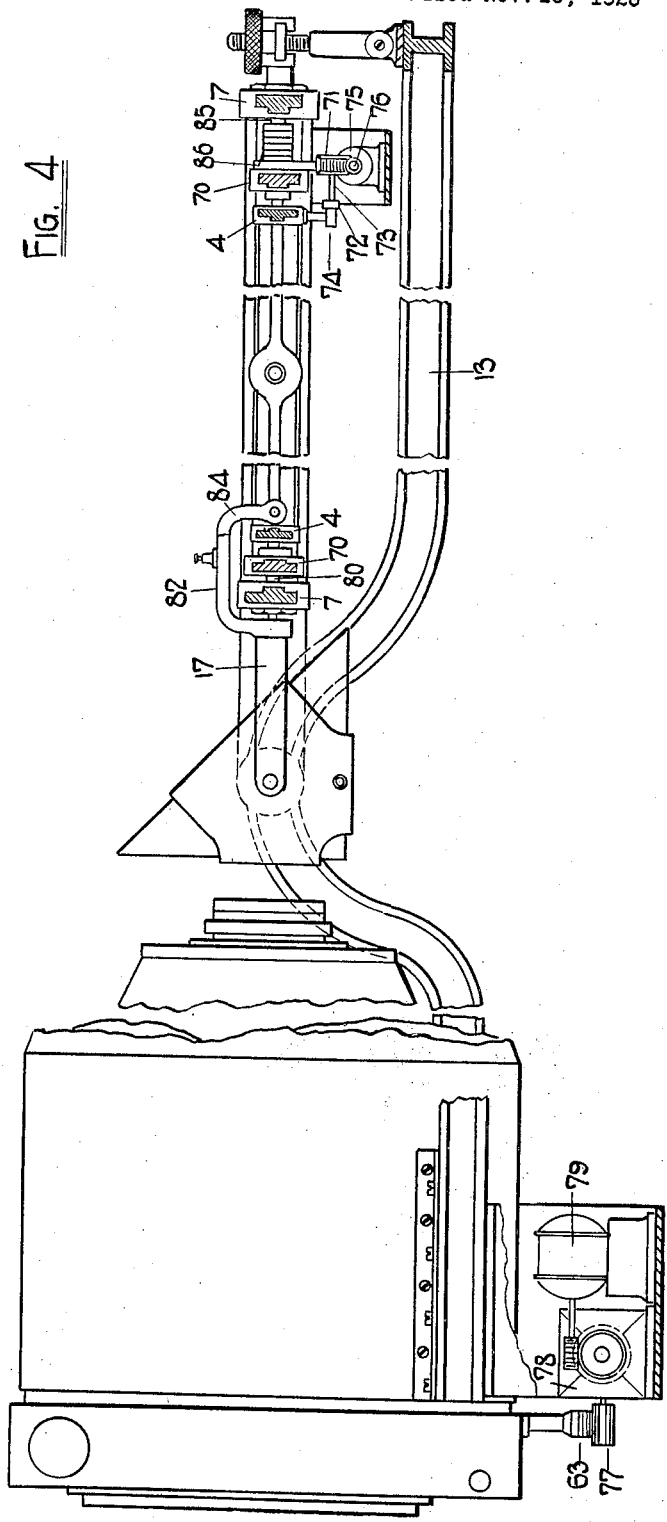
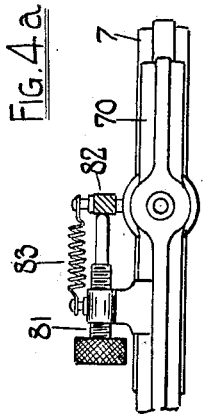
INVENTOR
JAMES B. HENDERSON
BY Henry Monkley,
    ATTORNEY Patented Apr. 16, 1929.

1,709,314

UNITED STATES PATENT OFFICE.

JAMES BLACKLOCK HENDERSON, OF BLACKHEATH, ENGLAND.

GYROSCOPIC STABILIZATION OF CAMERAS AND OTHER OPTICAL INSTRUMENTS.

Application filed November 15, 1923, Serial No. 674,871, and in Great Britain December 1, 1922.

This invention relates to optical instruments of the type in which the field of view is stabilized in the focal plane to eliminate the effects of angular movement of the platform on which the instrument is mounted. The principles and mechanism are applicable to practically all instruments of the above general type but as they are particularly useful in their application to cameras for aerial photography I herein describe the invention as so applied.

In my prior application Serial No. 391,189 now Patent 1,601,390, Sept. 28, 1926 I have described an arrangement whereby the image of the landscape vertically beneath the aeroplane is reflected into the camera lens by a reflector which is so controlled by a gyroscope that it moves angularly in two planes relatively to the camera through half the angle of angular movement of the camera relatively to the gyroscope, a principle which I refer to herein as "semi-stabilization". This semi-stabilization of the reflector completely stabilizes the image of the target in the focal plane of the unstabilized camera if the reflector is of the double-inverter type (i. e. one which turns the image upside down and right to left,) in which case the camera is arranged looking vertically downwards into the inverter. Such a reflector, however, involves as a rule either four reflections or two reflections and two refractions, which may have serious objections. If a plane mirror or single-reflection prism be used, then if the camera is mounted fore-and-aft as illustrated in my prior application, angular movement of the aeroplane in pitching would be compensated but rolling or banking would rotate the image on the photographic plate through half the angle of roll, while the image would be correct across the plate but reversed from top to bottom.

The present invention is aimed at overcoming these objections to the system described in my former application and also comprises further improvements to compensate for yawing of the aeroplane with which my prior application does not deal.

According to the present invention I arrange the camera horizontally and rigidly attached to the aeroplane and I mount a reflector opposite the lens which turns the image of the ground below into the horizontal plane. The reflector is preferably of the roof-prism type, consisting of a right-angled prism with double reflection on the hypotenuse. This prism is so linked to a gyroscope that it is fully stabilized in the vertical plane parallel to the focal plane of the camera but is only semi-stabilized in the vertical plane of the hypotenuse edge. The prism is pivoted about two axes which intersect in the centre of the hypotenuse face directly in front of the optical centre of the camera lens. This arrangement obviates lateral displacement of the image on the plate due to movement of the prism parallel to the plane of the lens. It also eliminates the effects of pitching of the aeroplane but still leaves a rotation of the image on the unstabilized plate through the angle of roll of the aeroplane. There also has to be considered the rotary effect of yawing.

With between-lens shutters and with very short exposures these rotary effects of rolling and yawing would be negligible, but with focal plane shutters which are now generally used, giving a short exposure of each part of the plate but a comparatively slow exposure of the whole, these movements result in distortion of detail in the direction of movement of the shutter. To overcome this I control the plate or back of the camera proportionately to the angle of roll or yaw of the aeroplane, rotating the plate in the focal plane through the angle of apparent movement of the image. By a combination of the above means the effects of angular movement of the aeroplane in any plane are fully eliminated, each photograph will have for its centre the point of the earth vertically beneath the prism and a series of photographs taken, say in surveying a given strip of ground will be similarly oriented in the plate so that the amount of overlap usually allowed can be considerably reduced. Each photograph will also be free from reversal in either direction.

Figure 2:
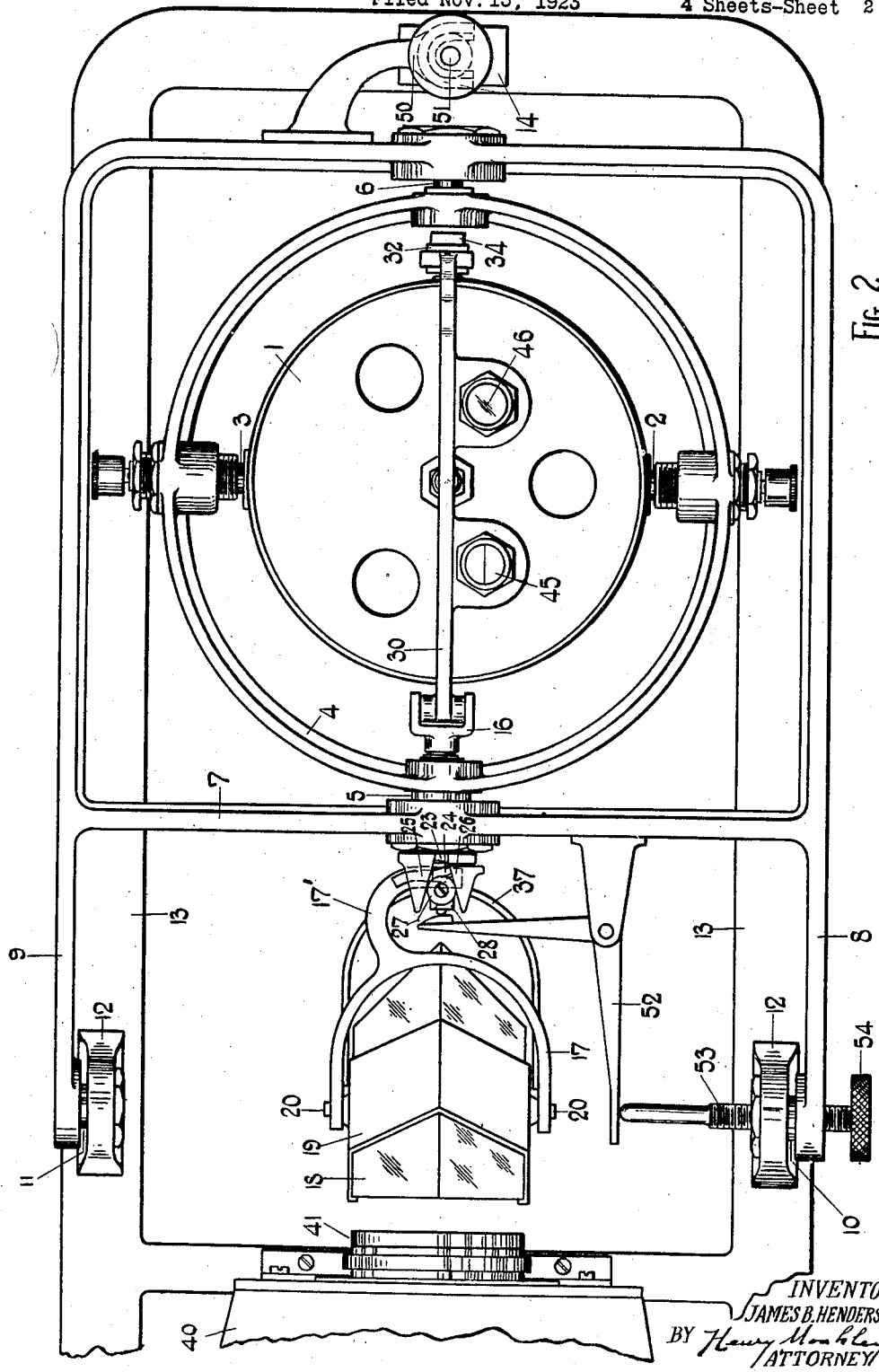

A preferred embodiment of my invention is illustrated in the accompanying drawings in which Fig. 1 is an elevation, part sectioned, and
Fig. 2 is a plan, of the gyroscopic apparatus for controlling the prism.
Fig. 3 is an elevation, part sectioned, and
Fig. 3ª is a side elevation of the camera to show my method of controlling the camera back to compensate for yaw.
Fig. 4 is an elevation of the whole apparatus, omitting the gyroscope and some other details found in Figs. 1 and 2, showing my method of controlling the camera back to eliminate the rotary movement of the image on the plate due to banking of the aeroplane, and also illustrating some construction alternative to details in Figs. 1 and 2.

Fig. 4ª is a side elevation of a detail of Fig. 4.

In Figs. 1 and 2, 1 is a gyroscope in its casing with approximately vertical rotor axis, pivoted on trunnions 2—3 in a gimbal ring 4, which in turn is pivoted on trunnions 5 and 6 in two opposite sides of a rectangular frame 7, the trunnion 5 being hollow. The other two sides of the frame 7 are prolonged in arms 8 and 9 which carry horizontal trunnions 10 and 11 supported in bearings in two pillars 12 on a main frame 13. The frame 7 is supported at its other end by the frame 13 on a single pillar 14.

In ball bearings in the hollow trunnion 5 is a spindle 15 which carries at one end inside the gimbal ring 4 a small horizontal fork 16 and at its other end outside the frame 7 a larger horizontal fork 17 at the end of a U-shaped neck 17′ shown more clearly in Fig. 2. The fork 17 carries the prism 18 in its frame 19 on pivots 20 which are collinear with the trunnion axis 10—11. The prism is a right-angle prism with a roof prism on its hypotenuse, the two pentagonal faces being vertical and horizontal and the roof-edge uppermost and towards the gyroscope. In the outer end of the spindle 15 is drilled an axial hole in which are housed a helical spring 21 and a pin 22 which is a good bearing fit in the hole. Arms 23 and 24 carried by the trunnion 5 and spindle 15 respectively have projections 25 and 26 which have machined faces oppositely inclined to the vertical plane of the trunnion axis 5—6. Between these faces is a double roller 27 pivoted on a vertical pillar 28 mounted on the outer end of the pin 22. The rollers 27 thus act as a key between the trunnion 5 and the spindle 15, that is to say, between the gimbal ring 4 and the prism 18 as regards movement round the trunnion axis 5—6. In other words the prism 18 will be stabilized by the gyroscope about the axis 5—6.

In the small fork 16 a bent arm 30 is pivoted on an axis pin 31, the arm spanning the gyroscope in the vertical plane of the trunnion axis and terminating in a small fork which supports a roller 32 on an axis pin 33, the roller resting on a small inclined platform 34 carried by the gyroscope. The platform 34 is pivoted on the gyroscope casing on a small trunnion 34′ and is inclined to the plane of rotation of the gyroscope at the same angle as a line joining the centre of suspension of the gyroscope to the centre of the axis 33. The pivot axes 31 and 33 are equidistant from the trunnion axis 2—3 with the result that if the frame 7 tilts round the gyroscope round that axis, the arm 30 will move angularly about the pivot 31 relatively to the frame through half the angle of angular movement of the frame relatively to the gyro.

The bent arm or frame 30 is continued below the fork 16 in a short arm 35 which is connected to a pair of eccentric trunnions 36 on the prism frame 19 by a link and fork 37 parallel to the spindle 15, the arm 35 being parallel to the distance of the trunnion axis 36 from the prism axis 20. Angular movement of the arms 30 and 35 round the pivot 31 will therefore be communicated in equal amount and direction to the prism 18. In other words the prism will be semi-stabilized about the axis 20.

The camera 40 is rigidly attached to the main frame 13 with its lens 41 facing into the vertical face of the prism and the entire apparatus is arranged on the aeroplane so that the lower face of the prism has a clear view of the earth beneath. An image of the ground vertically below the prism will therefore be reflected into the camera by the prism and the stabilization of the latter about the axis 5—6 and its semi-stabilization about the axis 20 will completely stabilize the image in the focal plane of the camera in so far as regards angular movement of the aeroplane about either trunnion axis of the gyroscope. So long, therefore, as the rotor axis of the gyroscope is vertical the image focussed on the plate of the camera will have for its central point the spot on the earth's surface which is vertically beneath the prism, but as the image is stabilized in the focal plane and the plate is not, it follows that any angular movement of the plate in the focal plane will rotate the image on the plate, but the photograph will remain a true photograph and its central point will not be moved from the centre of the plate.

To check verticality of the rotor axis and to correct for straying of the gyroscope I employ optical means. On the bent arm 30 I fix two small right-angled prisms 45 and 46 arranged with their hypotenuse faces to reflect vertically upwards an image of the air- or haze-horizon in two mutually perpendicular directions. As shown, the prism 45 views the horizon behind the plane of the paper and 46 the horizon in the direction of the trunnion 6. The images reflected by these prisms are viewed by the observer in two small telescopes, the eyepieces of which, numbered 45′ and 46′, respectively, are attached to the cover 47 which it attached to the frame 7. The telescope objective and graticule above the prism 46 are attached to the eyepiece as the prism is semi-stabilized relatively to its horizon by the arm 30, but as the prism 45 is fully stabilized relatively to its horizon I attach its telescope and graticule to the prism, leaving only the eyepiece unstabilized. The observer therefore has on the graticules of the two telescopes a fully stabilized view of the horizon in the direction of the two trunnion axes of the gyroscope by which he can detect departure of the rotor axis from the vertical. To correct for straying of the gyroscope I may provide manual means for precessing the gyroscope back to the vertical but for a fine adjustment I prefer to leave the gyroscope alone and adjust the prism 18 instead about either of its pivotal axes. To adjust it about the axis 20 the third support 14 of the frame 7 is adjustable in height by means of a nut having a milled head 50 carried by the frame 7 on a screw 51 on the pillar 14. By turning the milled head 50 the observer can tilt the frame 7 and the entire gyroscopic apparatus including the prism 18 about the pivot axis 10—11 which, as has been explained above, is collinear with the prism axis 20, until he obtans coincidence of horizon and graticule in the telescope 46—46'. To adjust the prism about the axis 5—6 I provide a bellcrank lever 52 (shown in Fig. 2) pivoted on the frame 7, one arm of which has a curved head bearing against a ball on the outer end of the pin 22. A screw 53 with milled head 54 is screwed axially through the trunnion 10 and bears against the tail of the lever 52. The pin 22 is kept pressed against the head of the lever 52 by the helical spring 21. By turning the milled head 54 the observer can alter the position of the rollers 27 in the V formed by the inclined faces 25 and 26 and, the position of the face 25 being fixed by the gyroscope, the adjustment will alter the position of the spindle 15 and prism 18 round the axis 5—6 relatively to the gyroscope. The two faces 25 and 26 are kept in engagement with the rollers 27 by a light spring (not shown) connecting the two arms 23 and 24. If the observer finds that the image of the horizon does not coincide with the graticule in the telescope 45—45' he will turn the milled head 54 until coincidence is restored and in so doing he rotates the prism 18 round the axis 5—6 until its lower face is directed vertically downwards.

It should be remarked in passing that a terrestrial horizon is useless in the air, but aerial photographs are usually taken in good weather in which circumstances a horizon of haze is generally encountered which it has been found practicable to use for the purpose indicated. In the absence of a good haze-horizon a low-lying distant cloud may be used.

Figs. 3 and 3ª illustrate a method of eliminating the effects of yaw. Aerial photography and particularly a continuous survey by vertical photographs requires very careful navigation and for that purpose a magnetic compass is too unreliable. Various types of gyroscopic azimuth indicators have been used. I prefer a gyro-compass but whatever instrument is used I use it to actuate a relay by which I control the photographic plate in the focal plane. As illustrated, the plate holder or dark slide 60 containing the plate is held by the usual type of revolving back 61 which is situated close behind the focal plane shutter 62. Instead of fixing the shutter rigidly to the camera body I pivot it thereon so as to be able to rotate parallel to the focal plane of the camera. To the body of the shutter I attach a toothed section 63 which meshes with a toothed pinion 64 on the spindle of a small step-by-step motor 65 mounted on a U-shaped cross member of the frame 13, the motor being controlled automatically from the gyro-compass in the same way as a repeater compass dial. So long as the aeroplane maintains a straight heading the plate will remain in a fixed relation to the focal plane, but if the aeroplane yaws off its course through an angle $\theta$ causing a rotation $\theta$ of the image in the focal plane, the camera back, shutter and plate will also be turned in the focal plane by the motor 65 through an angle $\theta$ in the direction required to maintain a constant relation between the image and the plate.

It has already been explained that the stabilization of the prism 18 about the axis 5—6 has the effect of rotating the image in the unstabilized plate through the angle of roll of the aeroplane. My method of eliminating this defect, as well as one or two items of alternative construction, are shown in Figs. 4 and 4ª, in which the gyroscope and its attachments are omitted as they are identical with those of Figs. 1 and 2. The frame 13 is made arched at the pivots 10—11 in order to clear the field of view of the prism for taking photographs inclined to the vertical. Between the gimbal ring 4 and the frame 7 I introduce a follow-up ring 70 similar to the follower of a gyro-compass. This follow-up ring 70 carries a worm sector 71 to which is attached a two-part commutator 72 on a short pillar 73, the commutator bearing against a contact roller 74 carried by the gimbal ring 4. The commutator and roller are wired in the usual way to a small reversible D. C. motor 75 which drives a worm 76 meshing with the worm sector 71, the motor 75 being supported by the frame 7. Attached to the other end of the shaft of the motor 75 (concealed behind the motor in Fig. 4) is the armature of a small transmitter. Underneath the camera and meshing with the toothed sector 63 already mentioned is a toothed pinion 77 on the differential shaft of a small differential gear 78, the two driving pinions of which are driven, one by the motor 65 of Fig. 3 (concealed in Fig. 4) and the other by a similar motor 79 attached by wiring, not shown, to the transmitter on the spindle of the follow-up motor 75. As the aeroplane tilts about the axis 5—6 the ring 70 must tilt with it, being keyed to the frame 7 by the worm gearing 71—76, and the gyroscope in maintaining its direction in space brings the contact roller 74 into contact with one or other segment of the commutator 72, thus closing the circuit to the motor 75, actuating it to keep the ring 70 in phase with the gyro. This movement of the ring 70 is communicated by the transmitter on the spindle of the follow-up motor 75 to the repeater motor 79, thence through the differential gear 78 and toothed gearing 77—63 to the back of the camera. The steps of the motor 79 and the various gears are arranged so as to rotate the camera back through the angle of movement of the ring 70, and the plate will therefore be kept in constant phase with the image of the ground.

The introduction of the follow-up ring 70 allows me to free the sensitive element of most of the work of controlling the prism 18. In Fig. 4 I show the fork 17 as carried on the outer end of the trunnion 80 of the follow-up ring 70, the trunnion being prolonged through the frame 7 for the purpose. The connection between the fork 17 and the trunnion 80 is not rigid, the fork being pivoted on the trunnion and adjustable round it by means of a fine adjustment screw 81 on the ring 70 (see Fig. 4ª) bearing against a curved arm 82 which is integral with the fork 17. A spring 83 keeps the arm 82 and pin 81 in engagement, being sufficiently strong to prevent any lag in response of the fork to movement of the ring 70. The arm terminates in a fork 84 which replaces the fork 16 of Fig. 1. The adjustment of the fork 17 round the trunnion 80, just described, takes the place of the corresponding adjustment by means of the milled head 54 of Fig. 2 and has the advantage of simplicity. The other trunnion 85 of the follow-up ring 70 carries six slip-rings 86 through which I lead in the current to drive the gyro rotor and also the current to the contact roller 74 and the two segments of the commutator 72.

The gyroscope has unlimited freedom as regards angular movement of the aeroplane round it, but it is obvious that if either by accident or design the aeroplane banked or dipped very heavily so as to bring the gyroscope seriously out of phase with the frame 7, certain portions of the apparatus would foul one another and be damaged. To obviate this I would fit spring stops between the gyroscope and the gimbal ring and also between the latter and the frame 7 so that beyond certain limits the gyroscope would cease to be free. These stops I fit in the most convenient positions, but as they are not an essential feature of my invention I have omitted them from the drawings.

With an aircraft camera controlled as I have described not only are truly vertical photographs possible but the effects of any angular movement of the aeroplane are completely eliminated even when focal plane shutters are used. A continuous survey by aerial photographs would have all the photographs similarly oriented in the plates irrespective of the actual heading of the aeroplane at the moment of exposure of each, while the large overlap now required between photographs to allow for lack of orientation could be reduced to a minimum.

I claim:

1. The combination of an optical instrument for use on an angularly moving body, an optical device rotatable about axes passing through it, a stabilizer, and connections therefrom to said rotatable optical device to stabilize the same and the field of view in the focal plane of the instrument.

2. The combination of an optical instrument for use on an angularly moving body and means to annul the effects on the field of view of such angular movement comprising a prism system to reflect an image into said instrument, a gyroscope, and differently acting connections to the prism system controlled by the gyroscope for stabilizing the prism system about one trunnion axis of the gyroscope, semi-stabilizing the same about another axis perpendicular thereto and stabilizing a portion of said instrument.

3. The combination of an optical instrument for use on an angularly moving body, means to annul the effect on the field of view of such angular movement comprising a prism system to reflect an image into said instrument, a gyroscope, means controlled by the gyroscope for stabilizing the prism system about one of the trunnion axes of the gyroscope and semi-stabilizing the same about an axis perpendicular thereto, means for adjusting the prism system about either of its axes of stabilization to compensate for straying of the gyroscope and means controlled by said gyroscope for stabilizing a portion of said instrument.

4. The combination of an optical instrument for use on an angularly moving body, a rotatable optical device pivoted about different axes, a gyroscope, separately acting connections therefrom to said optical device to stabilize the field of view in the focal plane of the instrument, and means for adjusting in the focal plane of the instrument a member containing a sensitized plate, graticule, screen or the like to compensate for the effect of angular movement of the moving body in the plane of the trunnion axes of the gyroscope.

5. The combination of an optical instrument for use on an angularly moving body, means including a gyroscope to stabilize the field of view in the focal plane of the instrument, a member in the focal plane of the instrument, mechanism responsive to angular movement of the body in the plane of the trunnion axes of the stabilizing gyroscope, and connections between the member and the mechanism for adjusting the member to compensate for such angular movement.

6. The combination of an optical instrument for use on an angularly moving body, means including a gyroscope to stabilize the field of view in the focal plane of the instrument, a member in the focal plane of the instrument, mechanism including a second gyroscope actuated in accordance with angular movement of the body in the plane of the trunnion axes of the stabilizing gyroscope, and connections between the member and the mechanism for adjusting the member to compensate for such angular movement.

7. The combination of an optical instrument for use on an angularly moving body, means including a gyroscope for compensating for the effect in the focal plane of the instrument of angular movements of the body about the optical axis of the instrument and about an axis perpendicular to the optical axis, a member in the focal plane of the instrument, mechanism responsive to angular movement of the body about an axis perpendicular to each of said axes, and connections between the member and the mechanism for adjusting the member to compensate for the last named angular movement.

8. The combination of an optical instrument for use on an angularly moving body, a prism system to reflect an image into the instrument, and means for stabilizing the prism system about a center on the line of collimation of the instrument comprising a gyroscope having one trunnion axis in coincidence with said line of collimation and means controlled by the gyroscope for stabilizing the prism system about said trunnion axis and an axis perpendicular thereto.

9. The combination of an optical instrument for use on an angulary moving body, a rotatable optical device, gyroscopic means connected thereto to effect relative rotation between said body and device to stabilize the field of view in the focal plane, and adjusting means to compensate for angular movement of the image in the focal plane.

10. The combination of an optical instrument for use on an angularly moving body, an optical device pivoted on different axes, gyroscopic means, connections between the same and said device to stabilize the field of view in the focal plane, and adjusting connections operable to turn said optical device to compensate for angular movement of the instrument parallel to the focal plane.

11. The combination of an optical instrument having an optical axis and for use on an angularly moving body, a rotatable optical part, stabilized connections thereto maintaining an optical axis thereof coincident with the first named axis to stabilize the field of view with reference to the axis of the instrument.

12. An optical instrument for use on an angularly movable body, comprising a frame, an optical part on the frame, means free from forced oscillation in phase with the oscillations of the body and connections from said means to said frame for stabilizing the frame in one plane and other connections from said means to said frame to semi-stabilize the frame in another plane.

13. An optical instrument for use on an angularly movable body, comprising a member to be attached to the body, a second member movably mounted on trunnions within the first member, a gyroscope mounted within the second member, a frame pivoted to turn about the axis of one of said trunnions, an optical part mounted in said frame, and means for connecting said frame with said second member, for stabilization in one plane and semi-stabilization in another plane by said gyroscope, including means for effecting a relative adjustment thereof about said axis.

14. An optical instrument for use on an angularly movable body, comprising a member to be attached to the body, a second member movably mounted on trunnions within the first member, a gyroscope mounted within the second member, a frame pivoted to turn about the axis of one of said trunnions, an optical part mounted in said frame, means for connecting said frame with said second member for stabilization in one plane and semi-stabilization in another plane by said gyroscope, and means mounted on the first member to adjust said connection without interfering with relative turning between the first member on one hand and the second member and frame on the other hand.

15. An optical instrument for use on an angularly movable body, comprising a member to be attached to the body, a second member mounted within the first member by means of trunnions, a gyroscope mounted within the second member, a frame pivoted to turn about the axis of one of said trunnions, an optical part mounted in said frame to turn about an axis cutting said trunnion axis at a right angle thereto, means for connecting said frame with said second member for control by said gyroscope, and means controlled by said gyroscope for turning a portion of said optical instrument about the axis making a right angle with the trunnion axis.

16. Optical apparatus for use on an angularly movable body, comprising an optical instrument having a part rotatable about the line of collimation thereof, means including a gyroscope for stabilizing the field of view in the focal plane of the instrument, and means including said gyroscope for controlling said rotatable part to compensate for rotative movements of said instrument about its line of collimation and maintain a substantially fixed relation between the rotatable part and the stabilized field of view.

17. Optical apparatus for use on an angularly movable body, comprising an optical instrument having a part rotatable about the line of collimation thereof, means including a gyroscope for stabilizing the field of view in the focal plane of the instrument, and means including a differential controlled jointly by said gyroscope and another gyroscope at a distance, to compensate for rotative movements of said instrument about its line of collimation and maintain a substantially fixed relation between the rotatable part and the stabilized field of view.

18. Optical apparatus for use on an angularly movable body, comprising an optical instrument having a part rotatable about the line of collimation thereof, means for stabilizing the field of view in the focal plane of the instrument, and means to turn said part to compensate for turning movements of the instrument about its line of collimation due to yawing.

19. Optical apparatus for use on an angularly movable body, comprising an optical instrument having a part rotatable about the line of collimation thereof, means for stabilizing the field of view in the focal plane of the instrument, and means to turn said part to compensate for turning movements of the instrument about its line of collimation due to the angle of roll.

20. Optical apparatus for use on an angularly movable body, comprising an optical instrument having a part rotatable about the line of collimation thereof, means for stabilizing the field of view in the focal plane of the instrument, and means to turn said part in a plane at right angles to the line of collimation to compensate for turning movements of instrument about its line of collimation due to yawing and the angle of roll.

JAMES BLACKLOCK HENDERSON.